United States Patent
Buhl et al.

[11] Patent Number: 5,318,373
[45] Date of Patent: Jun. 7, 1994

[54] BALL JOINT FOR MOTOR VEHICLES

[75] Inventors: Reinhard Buhl, Bohmte; Hans Dubielzig, Lemförder; Klaus Kramer, Damme; Reinhard Richter, Bohmte, all of Fed. Rep. of Germany

[73] Assignee: Lemforder Metallwaren AG, Lemforder, Fed. Rep. of Germany

[21] Appl. No.: 827,599

[22] Filed: Jan. 29, 1992

[30] Foreign Application Priority Data

Jan. 31, 1991 [DE] Fed. Rep. of Germany ....... 4102863

[51] Int. Cl.$^5$ ............................................. F16C 11/08
[52] U.S. Cl. ................................. 403/134; 403/122; 403/133; 403/140; 403/228; 384/206; 280/674
[58] Field of Search ................... 403/122, 132-135, 403/141, 143, 225, 228, 140; 384/206, 215; 280/674

[56] References Cited

U.S. PATENT DOCUMENTS

| | | | |
|---|---|---|---|
| 3,115,375 | 12/1963 | Haller | 384/206 |
| 3,273,924 | 9/1966 | Maxeiner | 403/140 |
| 3,282,602 | 11/1966 | Willingshofer et al. | 280/674 |
| 3,549,167 | 12/1970 | Haverbeck | 403/140 X |
| 4,034,996 | 7/1977 | Manita et al. | 403/140 X |

FOREIGN PATENT DOCUMENTS 885154 12/1961 United Kingdom ................ 384/215

Primary Examiner—Randolph A. Reese
Assistant Examiner—Harry C. Kim
Attorney, Agent, or Firm—McGlew and Tuttle

[57] ABSTRACT

A ball joint for chassis parts in motor vehicles is described, in which a hinge pin 1 with a spherical part 2 is mounted in a housing 3 by a bearing box 4. The hinge pin is led through an opening 6 out of the housing 3. The housing 3 is sealed by a lid 7, on the opposite side. In this case, the housing is placed in a rigid external bushing 10 with an elastomer sleeve 9 surrounding the housing. Radial surfaces on the housing 3, as well as on the external bushing 10, limit the axial movement of the housing 3 with respect to the external bushing. The radial surfaces of the housing 3 are formed by the two flat sides of a collecting plate 15, which can be firmly connected to the housing 3 first in the assembly of the joint. The collecting plate 15 engages with an axial moving space between arranged radial surfaces of the external bushing 10.

12 Claims, 10 Drawing Sheets

BALL JOINT FOR MOTOR VEHICLES

FIELD OF THE INVENTION

The present invention pertains to a ball joint for motor vehicles and particularly to a ball joint allowing limited axial movement between a housing surrounding the ball and an external bushing attachable to a motor vehicle.

BACKGROUND OF THE INVENTION

Such a ball joint is known from German patent #DE-GM 86 20 178. According to this patent, on the one end of the housing, which faces the hinge pin, a flange with a radial surface is formed, which cooperates with a radial opposing surface on a flange of the external bushing. Both flanges contain a radial-flange-type projection of the elastomer sleeve arranged between them. In the known arrangement, an internal bushing which can be slipped onto the housing, an external bushing and a rubber layer lying between them form a rubber metal part which is designed in adaptation to specific operating conditions, and against the radial flange of which the housing abuts with a corresponding flange in the zero position without forces. Axial oscillations between the housing and the external bushing are made possible to a limited extend, in which case, however, the deformations produced in the elastomer material immediately build up progressively increasing restoring forces, which, moreover, are different in the two shifting directions. Greater axial forces are perfectly conveyed in one direction.

SUMMARY AND OBJECTS OF THE INVENTION

It is a primary object of the present invention to provide a further development of ball joins, especially for purposes of wheel control. Defined limiting means, equally effective in both axial directions, are provided with the ball joints in a cost-favorable manner for axial vibrations between the housing and the external bearing. If necessary, an adjustable, limited axial play is made possible between the housing and the external bearing without restoring forces.

To attain the object of the invention, an embodiment of the present invention describes a ball joint with a hinge pin having a spherical end. The spherical end is surrounded by a housing and the housing is surrounded by an external bushing. The external bushing is connected to the housing by an elastomer sleeve. This elastomer sleeve allows a limited amount of axial movement between the housing and the external bushing. The housing has first and second radial surfaces which cooperate with first and second radial surfaces of the external bushing. Axial movement is limited in a first direction when the first radial surface of the housing comes into contact with the first radial surface of the external bushing. Axial movement is limited in a substantially opposite second direction when the second radial surface of the housing comes into contact with the second radial surface of the external bushing.

The characteristic to be emphasized in this case is the formation of the two radial extending surfaces on both sides of a flange that can be firmly connected to the housing in the assembly of the joint. By means of this formation, the essentially one-sided effect, known from the prior art, of the limitation of the axial movement between the external bushing and the housing is effective in both axial directions. At the same time, a simplification of the manufacturing cost is attained because the radial flange, on which the radial surfaces of the limitation of the axial movement are arranged between the housing and the external bushing, is firmly connected to the housing first in the assembly of the joint.

In a preferred embodiment according to the present invention, these radial surfaces, which can be firmly connected to the housing, are formed on a collecting plate. The collecting plate with the housing edge lies approximately in the place of the lid of the housing and together with this lid is connected to the housing by material deformation. This connection advantageously takes place in a known manner by flanging, tamping or the like. In a first, relatively simple embodiment, a lining made of an elastic material is provided between the radial surfaces on the two sides of this collecting plate and the opposite surfaces on the external bushing. These elastic linings are effective for the limitation of axial movement. Attention is drawn to the fact that these elastic linings do not exert any disadvantageous influence on the kinematics of the ball joint, but such a ball joint achieves a considerable contribution to the absorption of vibrations and thus to the improvement of comfort for the passengers of a motor vehicle. For the purpose of the simplification of manufacture, there is provided in a special exemplified embodiment where the external bushing encompasses the collecting plate only partly in diagonally opposite areas. This makes it possible that the elastic lining is, first in the preassembly, attached adhesively on arms extended diagonally outward to the corresponding end of the external bushing. In the assembly of the joint, these arms are bent inward against one another, so that they encompass the collecting plate externally in the desired manner. In this case, after the assembly of the joint, in order to attain an exact position of the elastic lining on the arms externally encompassing the collecting plate, a special design feature provides that the arms, which are extended diagonally outward, have a flange-shaped impression. The flange-shaped impression determines the position of the bending edge when bending in the arms, and that the elastic lining has a gap on the arms in the area of this impression which avoids a material jam when bending the arms inward.

In another preferred embodiment, the collecting plate, which can be firmly connected to the housing when assembling the joint, is arranged between two radial surfaces of the external bushing. The external bushings are arranged with a predeterminable axial distance from one another, such that the collecting plate can move between the two latter radial surfaces in a predeterminable margin with a likewise predeterminable axial resilience characteristic. In such an arrangement, if necessary, it is advantageous to provide the interacting radial surfaces with an elastic lining on at least one side in order to support axial movements in the end positions. In connection with such an arrangement, a radial spring deflection between the housing and the external bushing can be influenced in different ways in relative positions in that the elastomer sleeve has continuous indentations in the longitudinal direction. These indentations extend in a more or less large area about the circumference of the elastomer sleeve and are bridged in one piece on the ends by U-shaped webs. The webs are, above all, exposed to bending stresses and not any molecular shearing stresses in the area of the desired axial play between the housing and the external bushing. In this case, the U-shaped webs serve for covering the indentations and prevent the infiltration of dirt into the indentations.

Finally, it is especially useful that the first and second radial surfaces of the external bushing can be advantageously made with the edge of the external bushing and encompassing the collecting plate. The first and second radial surfaces of the external bushing can be connected to the edge of the external lid by material deformation (e.g., by flanging), and the second radial surface of the external bushing can be formed on this external lid. Instead of the external lid, only one metal plate, which extends diagonally over the housing, can also be provided. The ends of the metal plate can be connected to two diagonally opposite positions with bracket-type projections of the external bushing, which externally encompass the collecting plate.

Exemplified embodiments of the present invention are shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
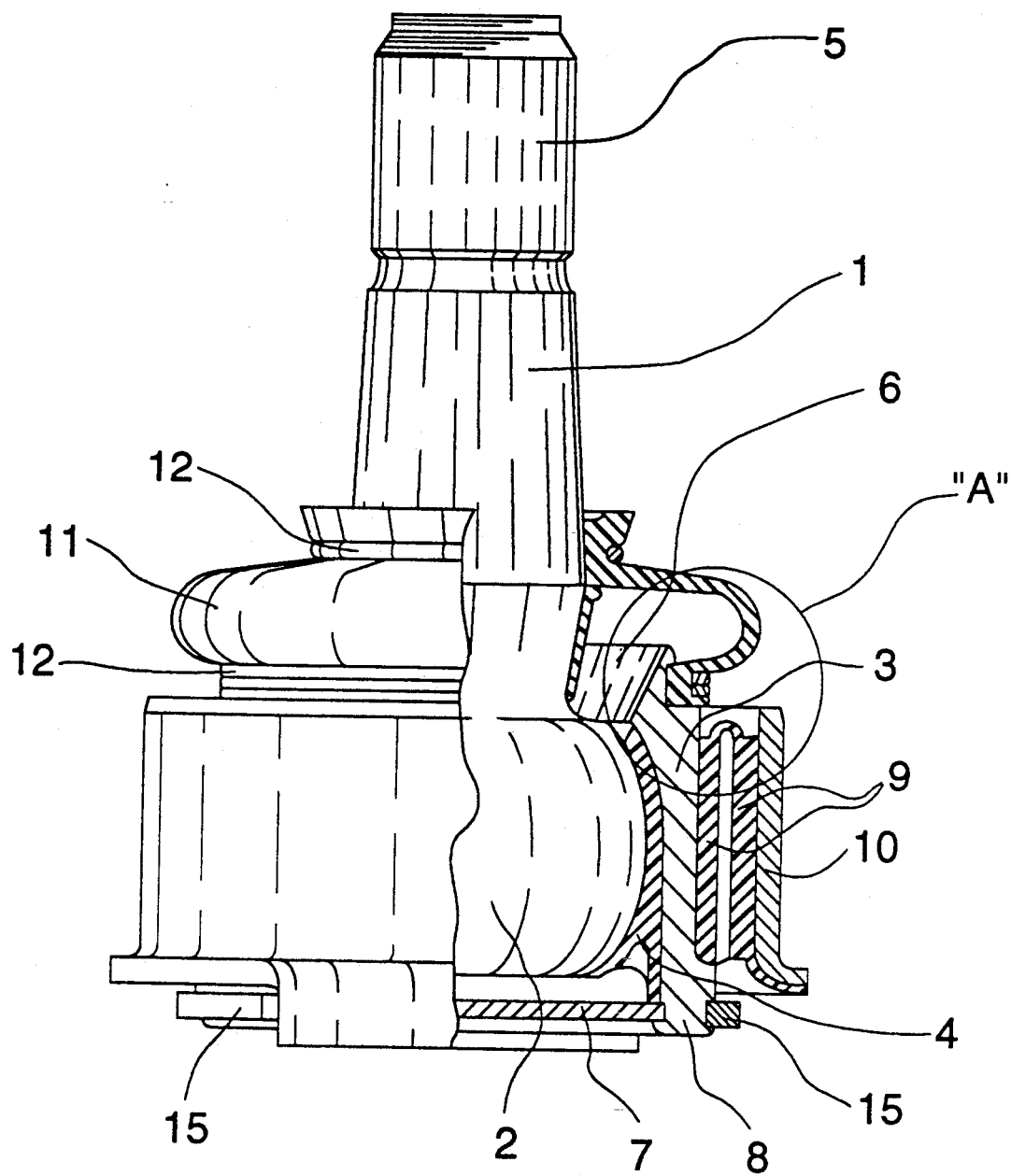
FIG. 1 shows a ball joint, half in a sectional view in an axial plane and half in an external view.
Figure 2:
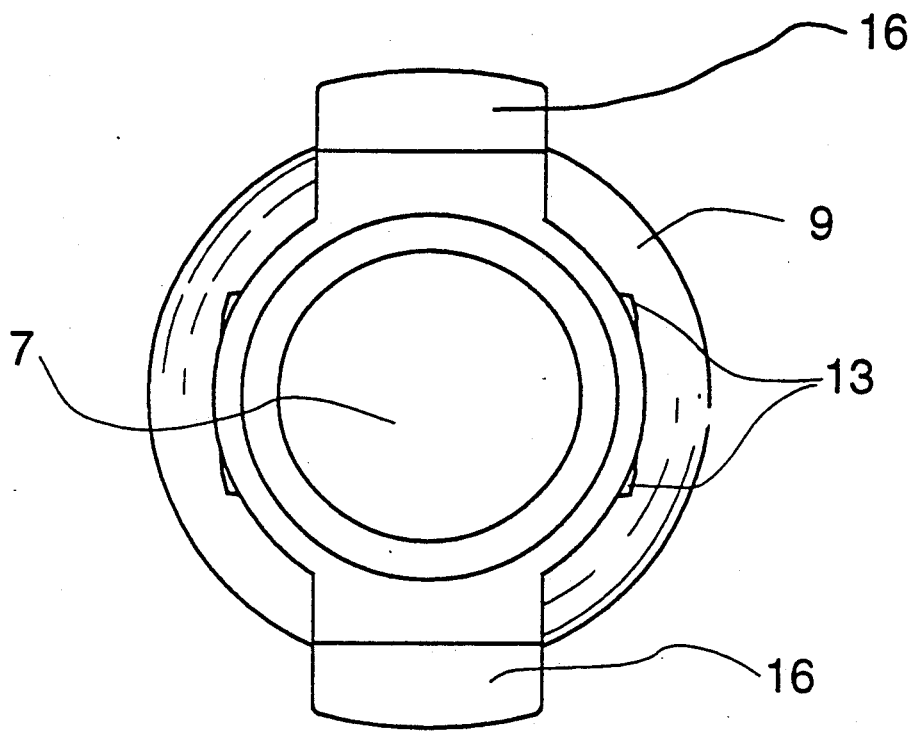
FIG. 2 shows a top view of the ball joint according to FIG. 1.
Figure 6:
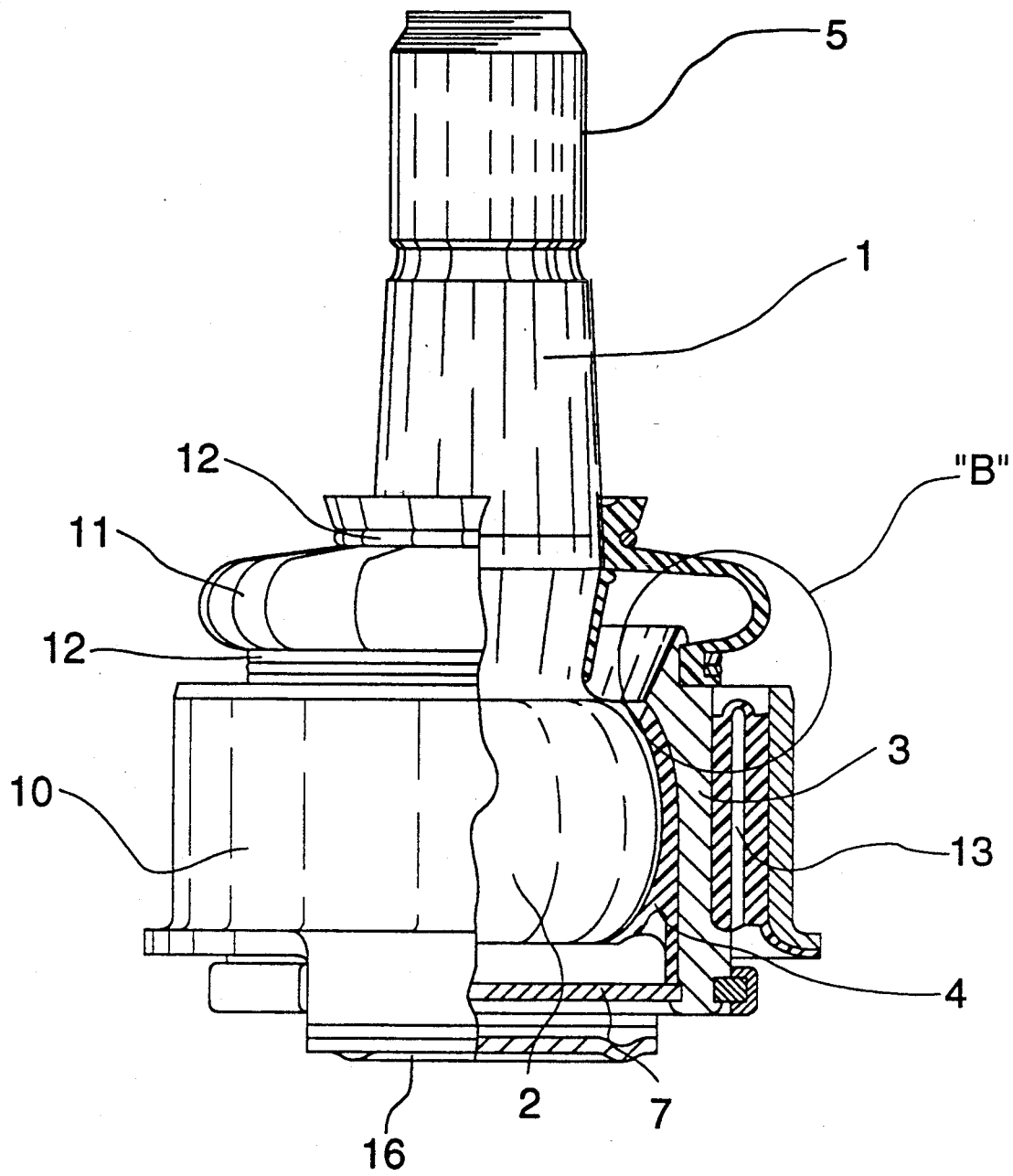
FIG. 6 shows a representation corresponding to FIG. 1 in the case of a modified exemplified embodiment.
Figure 7:
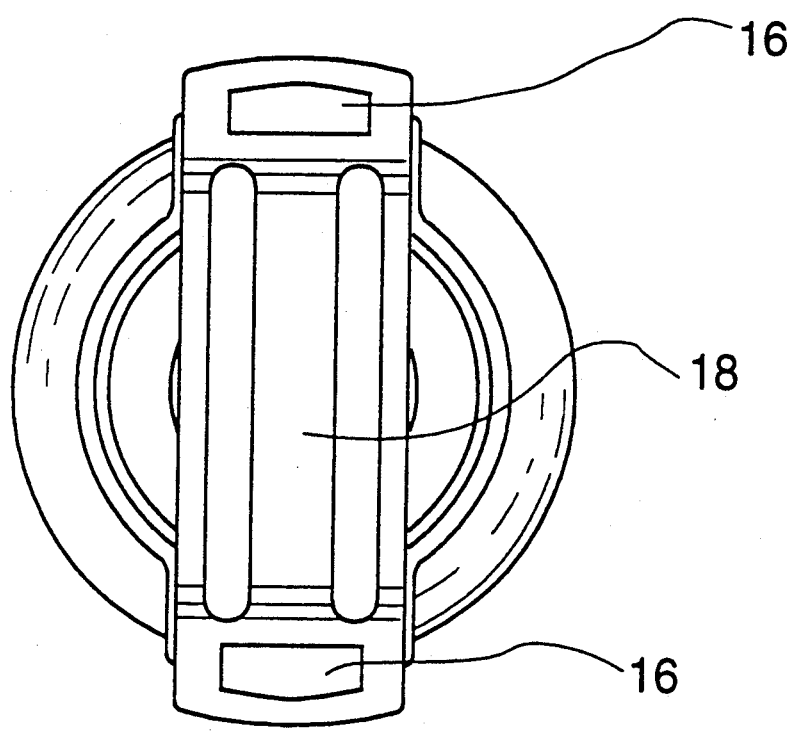
FIG. 7 shows a top view of the example according to FIG. 6.
Figure 9:
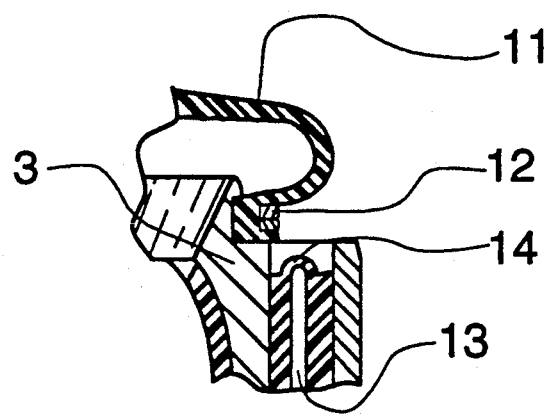
FIG. 9 shows an enlargement of detail B in FIG. 6.
Figure 10:
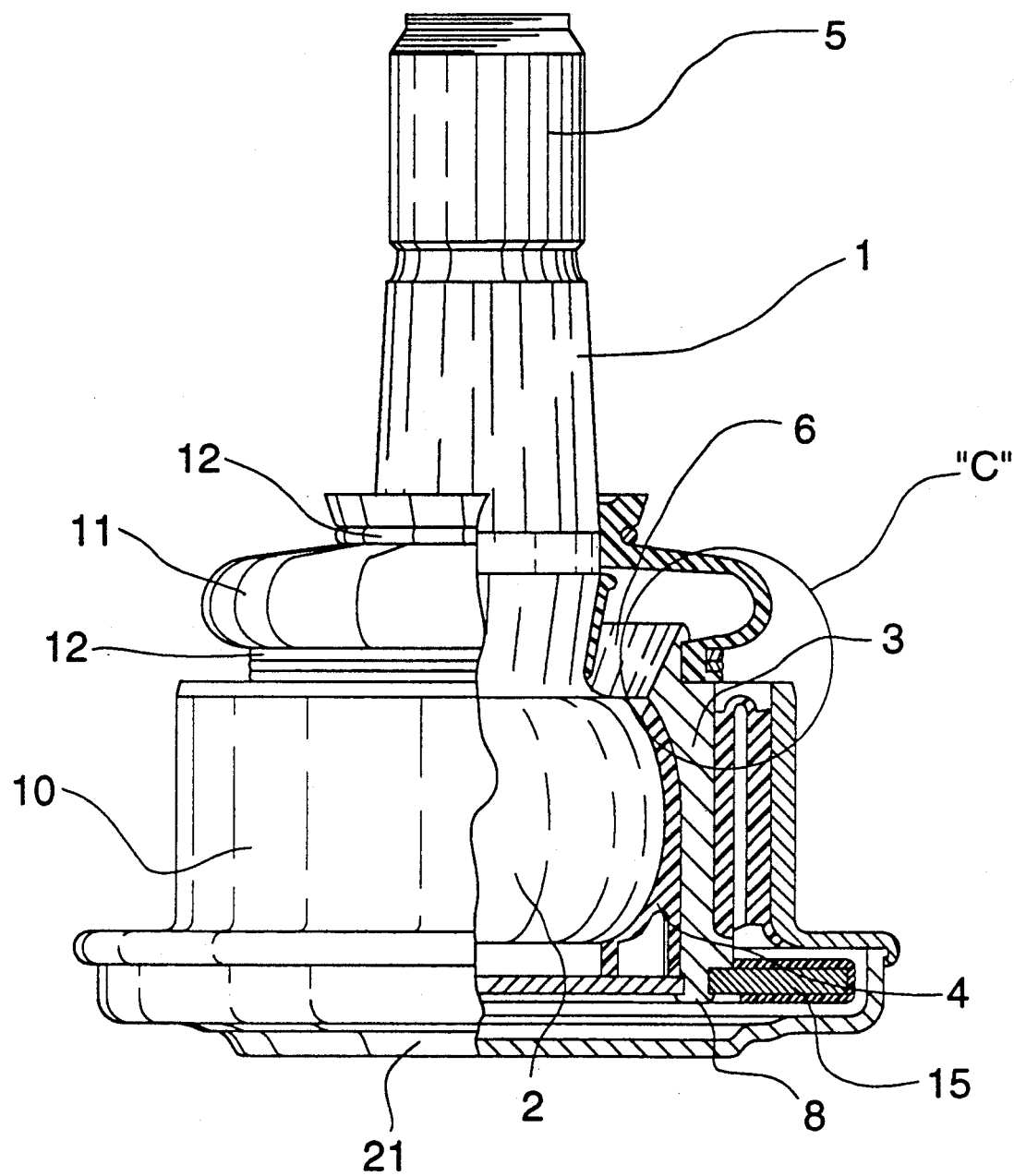
FIG. 10 shows a representation corresponding to FIG. 1 of another exemplified embodiment.
Figure 11:
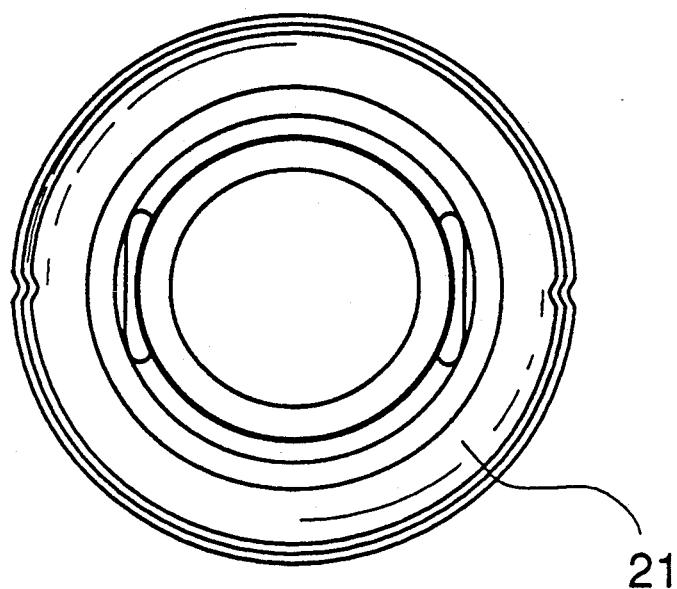
FIG. 11 shows a top view of the arrangement according to FIG. 1.
Figure 13:
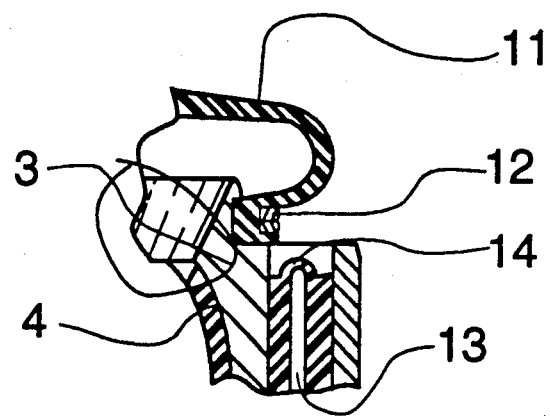
FIG. 13 shows an enlargement of detail C in FIG. 10.
Figure 12:
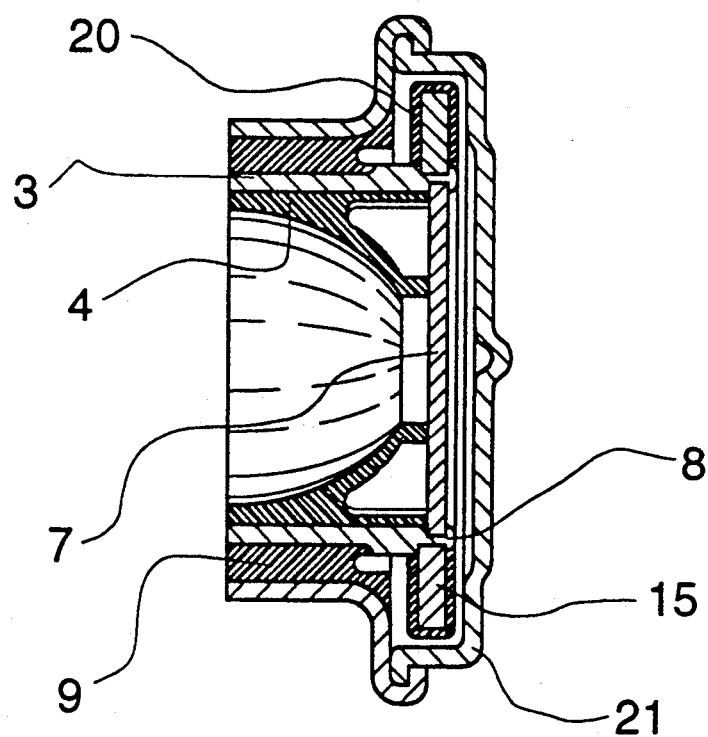
FIG. 12 shows a partial sectional view through the arrangement according to FIG. 10 perpendicular to the plane of projection.

The ball joints according to the exemplified embodiments of FIGS. 1, 6 and 10, in corresponding style, consist of the hinge pin 1 with the spherical part 2 formed on one of its ends. A bearing box 4, which is made of a bordered elastic material, mounted in a housing 3, in which the spherical part 2 is movably mounted on all sides. The hinge pin 1 is led out of the housing 3 through an opening 6 with the screw thread end 5 serving as the attachment. The other end of the housing is sealed with a lid 7. The connection of the lid 7 to the housing consists of a flared flange or the like and can be exerted by a certain initial stress on the bearing box 4. The outside of the housing 3 is surrounded by an elastomer sleeve 9, which, for its part, is mounted in a rigid external bushing 10. There are adhesive connections both between the housing 3 and the elastomer sleeve 9 and between the sleeve and the external bushing 10. A sealing bellows 11 is attached with its one end on the edge of the housing 3 surrounding the opening 6 and with its other edge on the shank of the hinge pin 1. This avoids the infiltration of contaminants through the open housing side into the joint. In the case of this embodiment, lock washers 12 or the like serve to attach the sealing bellows 11 with its ends to the housing 3 or to the shank of the hinge pin 1. Such a ball joint is mounted with the external bushing 10 in a bearing eye of a vehicle part and is attached to another vehicle part with the screw thread end 5 of the hinge pin 1.

In all the exemplified embodiments shown, the elastomer sleeve 9 is provided with indentations which extend in the axial direction and are continuous over the length of the elastomer sleeve. The indentations extend over a desired partial area of the circumference in conformance with the operating conditions. Thus, material areas lie between the indentations 13 for absorbing effective vibrations in the direction of rotation. On the ends, these indentations 13 are bridged by U-shaped webs 14 which are tip-stretched in one piece. By means of these indentations which extend in the longitudinal direction parallel to the longitudinal axis of the joint, any desired adaptation of radial spring deflection within the permissible movement area can be attained. Also, the shape of these indentations can be freely determined in conformance with the desired purpose.

Figure 3:
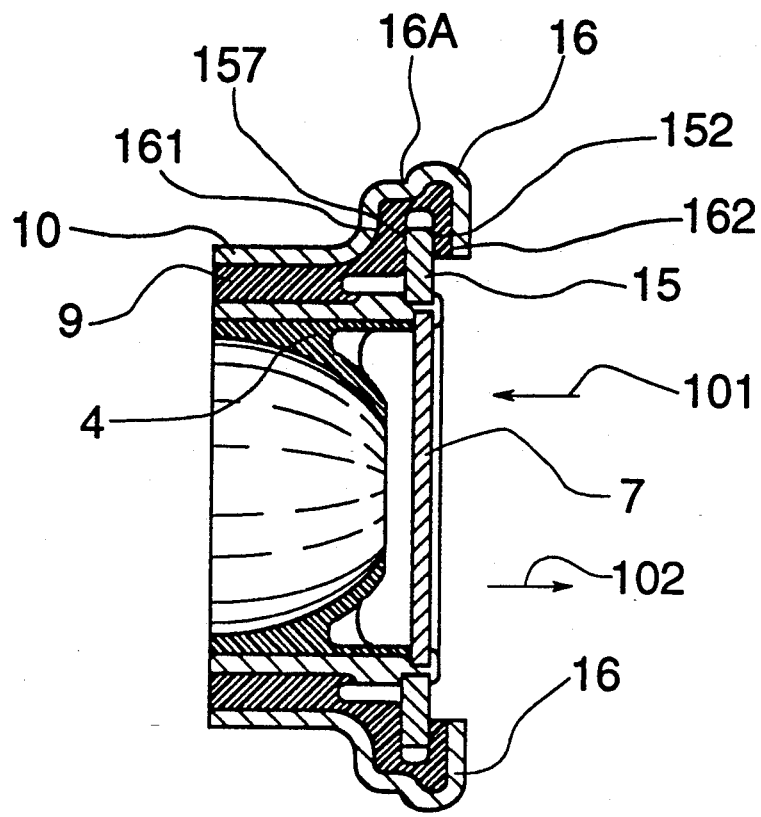
FIG. 3 shows a partial sectional view of the arrangement according to FIG. 1, but offset by 90° to the arrangement.
Figure 4:
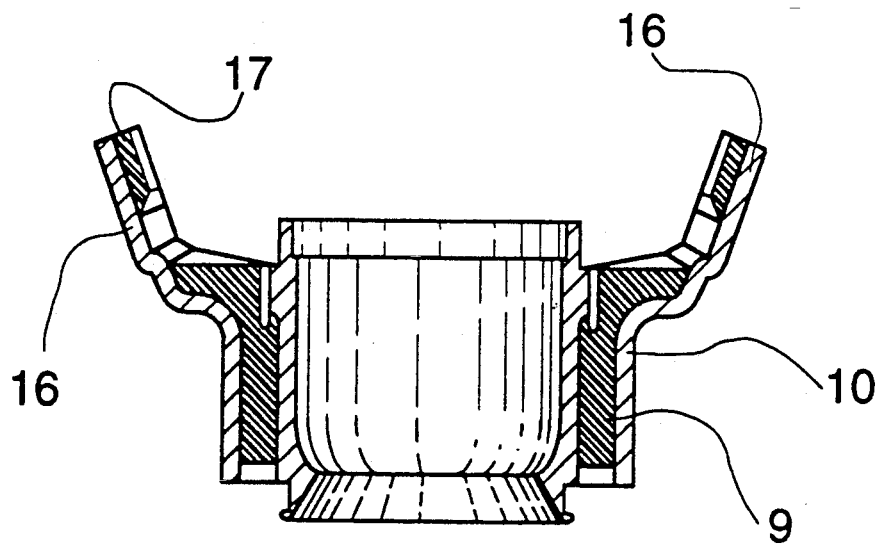
FIG. 4 shows a partial sectional view corresponding to FIG. 3 in the preassembled state.
Figure 5:
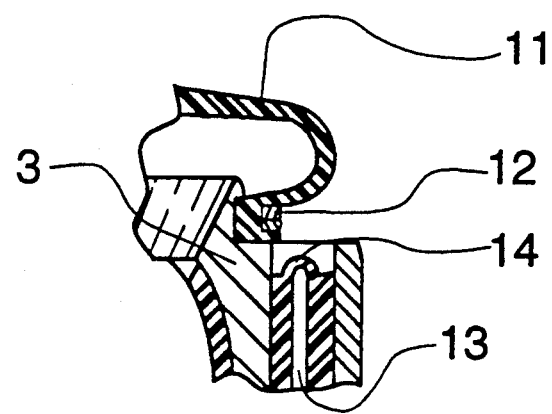
FIG. 5 shows an enlargement of detail A in FIG. 1.

In executing the idea according to the present invention, a collecting plate 15 can be firmly connected to the lid-sided edge of the housing 3 in the assembly of the joint. This collecting plate 15 lies approximately in the plane of the lid 7 for the housing 3, so that the connection of the collecting plate 15 to the housing 3 can take place in one operation when sealing the housing 3. Therefore, the lid 7 and the collecting plate 15 are flanged, tamped or attached in another manner by material deformation in one operation. In the exemplified embodiment according to FIGS. 1 to 4, the end of the external bushing 10 facing the open housing side is provided with arm-type extensions 16 in two areas. The arm-type extensions are diametrically opposite the longitudinal axis of the joint which externally encompass the collecting plate 15. The elastomer material of the elastomer sleeve 9 also extends in the area of these arm-type extensions 16 between their inner side and the collecting plate 15. For the purpose of facilitated manufacture, these arms 16 are, according to FIG. 4, placed diagonally outward in a preassembly stage and are adhesively connected on the inside to the elastomer material 17 of the elastomer sleeve 9. Subsequently, the arms 16, in the assembly of the joint, are bend around the collecting plate 15 into the position seen in FIG. 3. In this case, in order to achieve that a flawless material deformation is possible and the radial surfaces of the arms 16 extend parallel to the radial surfaces on the surface sides of the collecting plate 15, the elastomer lining 17 is weakened or interrupted on the inside of the arms 16 in the area between the radial surfaces. Moreover, the arms 16 are provided on the later bending positions with a flange-like impression 16A determining their positions. The two arms 16 externally encompassing the collecting plate thus limit the axial movement of the housing 3, in first and second directions 101 and 102, with respect to the external bushing 10. In this embodiment, a corresponding righting moment is designed by the elastic lining 17 on the inside of the arms 16 in the case of axial movementsof the housing opposite the external bushing 10.

Figure 8:
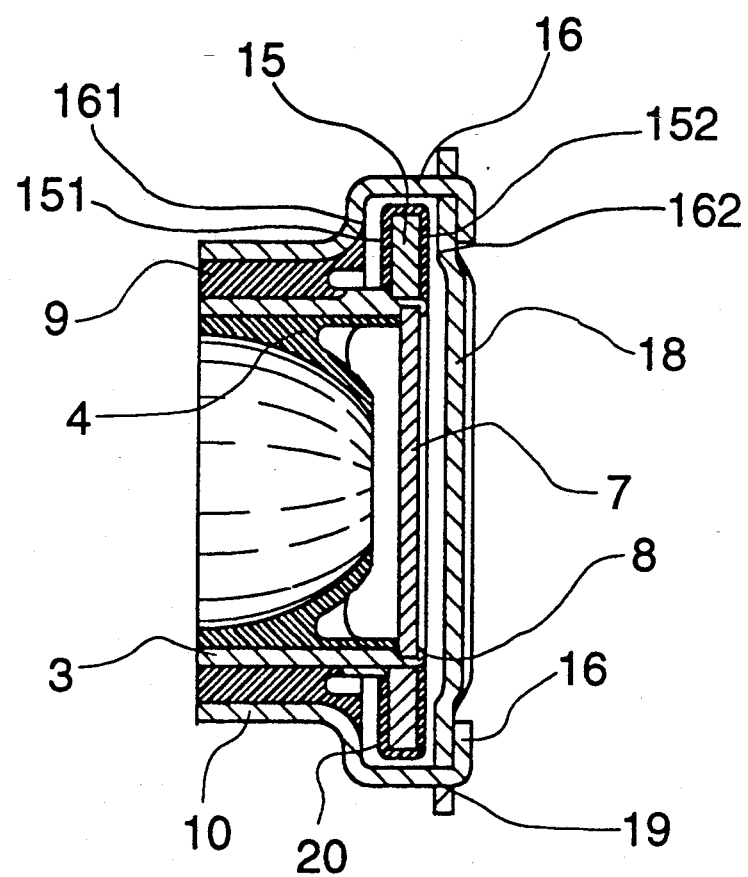
FIG. 8 shows a partial sectional view of the arrangement according to FIG. 6 perpendicular to the plane of projection.

In the exemplified embodiment according to FIGS. 6 to 9, arm-type extensions 16 are likewise formed on the lid-sided end of the external bushing 10 in two area which are diagonally opposite the longitudinal axis of the joint. The arm-type extensions 16 externally encompass a collecting plate 15 which, in the mounting of the joint, can be firmly connected to its housing. An exemplified embodiment is shown, in which the free ends of the arms 16 are inserted through grooves 19 in a metal external bushing plate 18 and are then bent (FIG. 8). Compared to the previously explained, exemplified embodiment in FIGS. 1 to 5, there is a distinctive feature in that there is free axial play between radially extending first and second surfaces, 151 and 152, on the collecting plate 15 and the corresponding substantially opposite radially extending first and second surfaces, 161 and 162, on the arms 16. The inside of the metal external bushing plate 18 can also be considered as a radial surface similar to the second radial surface of the arms 16. In this way, the housing 3 can freely move with the collecting plate 15 within this axial margin until it is stopped by the first or second radial surfaces contacting each other. In this arrangement, moreover, a certain safety against redeformation of the bent arms is attained by the metal plate 18. However, in order to smoothly support axial movements on the ends limited by the stop surfaces, it is recommended to coat at least one of the radial collecting surfaces with an elastic material. In the case of the exemplified embodiment shown, the collecting plate is provided with a coating 20 bordering its edge. Also in this embodiment, the collecting plate 15 and the lid 7 are connected with the housing 3, in the assembly of the joint, by a common flared flange 8.

In FIGS. 10 to 13, an exemplified embodiment is shown, in which the external bushing 10 has only one collar edge radially projecting outward, which, on the other hand, is connected to a cup-shaped edge of an outer lid 21, for example, by flanging. The arrangement of the collecting plate 15 and its connection to the housing 3 corresponds to the description of the exemplified embodiments of FIGS. 6 to 8. In the arrangement according to FIGS. 10 to 11, the flange edge on the external bushing 10 forms one of the radial opposite surfaces for the collecting plate 15, while the other radial opposite surface is formed on the inside of the cup-shaped external lid. By the representation in FIG. 11, it is clear that this cup-shaped lid can also be formed in the shape of a circle, that is, it is open in the center area. However, a closed formation is preferred if there is a special danger of soiling.

While specific embodiments of the invention have been shown and described in detail to illustrate the application of the principles of the invention, it will be understood that the invention may be embodied otherwise without departing from such principles.

What is claimed is:

1. A ball joint comprising:
    a hinge pin having a spherical part;
    a housing surrounding said spherical part of said hinge pin;
    an external bushing surrounding said housing;
    elastomer sleeve means for elastically connecting said housing to said external bushing;
    a lid attached to said housing and closing an end of said housing; and
    axial limiting means for limiting axial movement between said housing and said external bushing, said axial limiting means includes a collecting plate provided on said housing and with first and second radial surfaces and said axial limiting means also includes first and second radial surfaces on said external bushing, said first radial surface of said collecting plate having a coating of elastic material and contacting said first radial surface of said external bushing through said coating of elastic material to limit axial movement in a first direction and said second radial surface of said collecting plate having another coating of elastic material and contacting said second radial surface of said external bushing through said another coating of elastic material to limit axial movement in a second direction, said first and second radial surfaces of said lid being moveable, and said lid being connected to said housing by means of material deformation of said housing.

2. A ball joint comprising:
    a hinge pin having a spherical part;
    a housing surrounding said spherical part of said hinge pin;
    an external bushing surrounding said housing;
    elastomer sleeve means for elastically connecting said housing to said external bushing;
    a lid attached to said housing and closing an end of said housing;
    axial limiting means for limiting axial movement between said housing and said external bushing, said axial limiting means includes a collecting plate provided on said housing and with first and second radial surfaces, and said axial limiting means also includes first and second radial surfaces on said external bushing, said first radial surface of said collecting plate contacting said first radial surface of said external bushing to limit axial movement in a first direction and said second radial surface of said collecting plate contacting said second radial surface of said external bushing to limit axial movement in a second direction,
    said first and second radial surfaces of said external bushing are positioned at an end of said external bushing and encompass said collecting plate.

3. A ball joint in accordance with claim 2, wherein:
    said elastomer sleeve means has continuous indentations in a longitudinal direction; and
    U-shaped webs which are tip-stretched to bridge said continuous indentations.

4. A ball joint in accordance with claim 2, further comprising:
    an elastic material positioned between one of said first radial surface of said collecting plate and said first radial surface of said external bushing, and also positioned between said second radial surface of said collecting plate and said second radial surface of said external bushing.

5. A ball joint in accordance with claim 2, wherein:

said first and second radial surfaces of said external bushing only partially encompass said collecting plate in two diagonally opposite areas.

6. A ball joint in accordance with claim 2, further comprising:
   arm-type extension means for forming said first and second radial surfaces of said external bushing by bends in said arm-type extensions after said housing has been inserted into said external bushing, said arm-type extensions having impressions for predermining said bends; and
   an elastic material on said arm-type extension, said elastic material defining a gap in an area of said impressions.

7. A ball joint in accordance with claim 2, further comprising:
   an external bushing plate attached to said end of said external bushing, said external bushing plate extending diametrically over said lid.

8. A ball joint in accordance with claim 7, wherein:
   said external bushing plate is attached to said external bushing by material deformation, and said external bushing plate forms said second radial surface of said external bushing.

9. A ball joint comprising:
   a hinge pin having a spherical part;
   a housing surrounding said spherical part of said hinge pin;
   an external bushing surrounding said housing;
   elastomer sleeve means for elastically connecting said housing to said external bushing;
   axial limiting means for limiting axial movement between said housing and said external bushing, said axial limiting means includes a collecting plate provided on said housing and with first and second radial surfaces and said axial limiting means also includes first and second radial surfaces on said external bushing, said first and second radial surfaces of said external bushing surrounding said first and second radial surfaces of said collecting plate, said first radial surface of said collecting plate and said first radial surface of said external bushing defining a free space.

10. A ball joint in accordance with claim 9, wherein:
    said second radial surface of said collecting plate and said second radial surface of said external bushing define a free space.

11. A ball joint in accordance with claim 9, further comprising:
    a coating of elastic material on said first and second surfaces of said collecting plate, said elastic coating on said first radial surface of said collecting plate and said first radial surface of said external bushing defining said free space.

12. A ball joint in accordance with claim 11, wherein:
    said elastic coating on said second radial surface of said collecting plate and said second radial surface of said external bushing define another free space.

* * * * *